June 7, 1960 P. F. GUERCHET 2,939,387
PRINTING MACHINE FOR USE WITH CYLINDRICAL ARTICLES
Filed June 14, 1957

2,939,387
Patented June 7, 1960

2,939,387

PRINTING MACHINE FOR USE WITH CYLINDRICAL ARTICLES

Pierre François Guerchet, 43–45 Rue Pierre Valette, Malakoff, France

Filed June 14, 1957, Ser. No. 665,864

Claims priority, application France June 16, 1956

1 Claim. (Cl. 101—40)

This invention relates to printing machines of the type used to print various standard data upon the outer surface of mass produced articles, and specifically to such a machine for use with comparatively small articles of generally cylindrical shape, such as containers and phials for pharmaceutical products and similar goods.

Heretofore such machines were generally discontinuous and reciprocatory in action, and their operation was not entirely satisfactory. It is therefore an object of the invention to provide a printing machine of the type specified, which is continuous in character and will operate at a greatly increased output rate, while being readily operated by unskilled personnel.

Various medicinal products, such as antibiotics, are sold in sealed phials each containing a dose of the drug. The phials may be made of glass which is brittle or of suitable deformable plastic materials. Difficulty is encountered in printing upon the surface of the phials various standard information that may be required, such as the trade mark, chemical composition, date of preparation and the like. With glass phials utmost care must be exerted that the printing pressure does not exceed a low maximum value so as not to break the phials, while with flexible phials collapse of the phial under the printing pressure will result in a distortion of the printed matter. It is consequently an object of the invention to provide a continuous printing machine of the stated character which will provide clear, legible, non-distorted print upon cylindrical articles that are deformable, and one which will not break or damage the articles even where the latter are made from brittle material such as glass.

A printing machine according to a main aspect of the invention comprises a rotatable recessed drum having peripheral grooves for receiving separate articles from a supply, arcuate guide means for restraining the articles in the grooves over a limited arc of drum rotation, and a printing member mounted within the recess of the drum and adapted to cooperate serially with said articles as the latter reach a predetermined printing position along said guide means.

An embodiment of the invention will now be described by way of illustration but not of limitation with reference to the accompanying diagrammatic drawings wherein.

Figure 2:
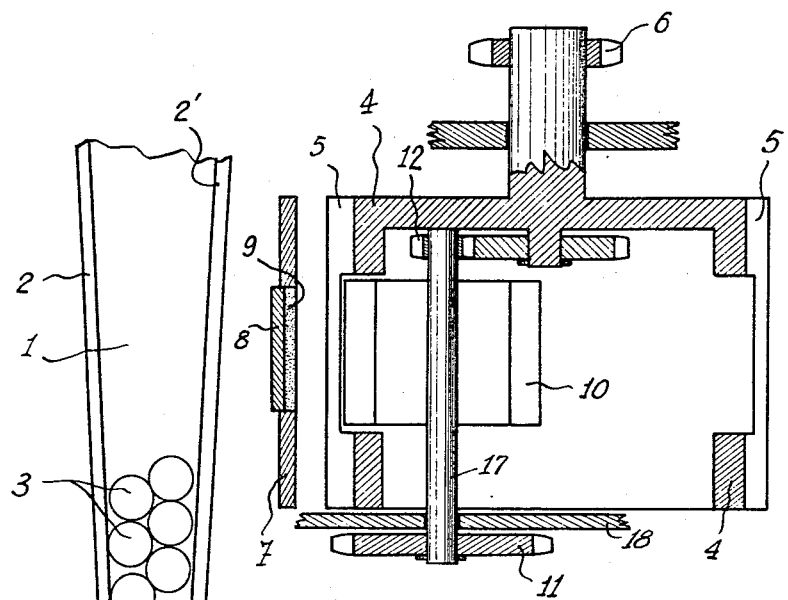
Fig. 2 is a section on line II—II of Fig. 1.

As shown, the improved machine comprises a gravity feeder or hopper 1 constituting a source of substantially identical cylindrical articles and having walls 2, 2' tapered downwardly at a small angle of, for example, the order of about 12° or less. Adjacent to the bottom outlet of the feeder 1 is part of the periphery of a cylindrical distributor drum 4 which is hollow and has a set of peripheral semi-circular or part cylindrical grooves 5 or flutes formed longitudinally around the periphery of the drum. The grooves 5 are parallel to the axis of the drum and have a common radius slightly greater than that of the articles. The depth of these grooves is at least equal to their radius. The arrangement is such that a batch of small cylindrical articles 3, such as phials, stored in the feeder 1, move downwards under the influence of gravity and/or vibrations imparted, if desired, to the feeder, to be individually received in the consecutive grooves 5 of the distributor drum; the grooves are somewhat larger in diameter than the outer diameter of the phials. The drum 4 is journalled in a suitable frame shown in part in Fig. 2, and is driven in continuous rotation by a pinion 6 secured to the drum and driven from any suitable source of power, not shown.

The wall 2 of the feeder on the side opposite from that on which the distributor drum is arranged, is extended downwardly beyond the outlet by an arcuate surface of a guide member 7, the guide surface being generally concentric with a portion of the periphery of drum 4. Interposed in the guide surface is a yielding backing or cushioning element 9 made, for example, of rubber, foam resin or the like, and adjustable radially of the drum by means of a suitable pressure adjusting device 8, the adjustment being effected, for example, by screws as diagrammatically indicated in Fig. 1.

Mounted within the hollow drum 4 on a shaft 17 journalled in the frame 18 of the machine is a printing roller 10 which is driven in rotation at a suitable angular speed by a gear 11 secured on the shaft of roller 10 outside of the cylinder 4. Roller 10 is a smooth cylinder of rubber or the like.

An ink supply mechanism, which may include a pair of ink supply rollers 14, 15 cooperating with an ink well 16, and a type roller 13, are also rotated from the printing roller 10 through a gear drive including the pinion 12. Roller 13 is engraved with positive relief characters and transfers characters in ink onto roller 10 which, in turn, transfers these characters onto the phials. The axes of rollers 10 and 13 are spaced and parallel and the roller 10 is rotatably mounted in drum 4 with its axis spaced from the nearest groove by a distance which is less than the radius of roller 10.

Figure 1:
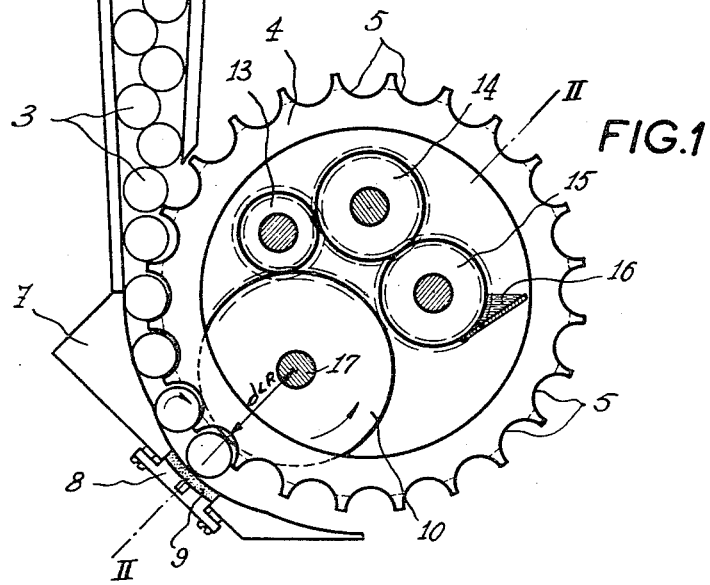
Fig. 1 is a diagrammatic side view of the main components of the machine.

In operation, on rotation of the distributor drum 4 in a counterclockwise direction according to Fig. 1, the phials 3 are individually received in the grooves 5 and are caused to roll along the arcuate guide surface of member 7, each phial rotating in a clockwise direction about its axis as indicated by an arrow in the figure. Guide 7 is generally concentric with drum 4 but element 9 is concentric with roller 10 as each phial reaches a printing position where it engages the backing element 9 along an outer generatrix of the cylindrical phial surface, the opposite inner generatrix of that phial is simultaneously engaged by the printing roll 10 whereby the phial is urged away from the bottom of the associated groove 5. It is possible so to select the drive ratio of the roll 10 that the relative linear velocity at this time between the surface of the roll 10 and that of the phial 3 is substantially zero, in other words the phial is engaging the roll without relative slippage or friction, so that the printing operation is performed under best possible conditions in clear outline, without fuzziness or smudges.

At the same time, the position of the yielding backing element 9 may be so adjusted by means of the pressure adjusting means 8 that the printing pressure will be sufficient for producing a clear print while taking up any irregularities in the cylindrical surface of the articles 3, without the pressure being so great as to cause an objectionable collapse of the walls of said articles if flexible, which would lead to distortion of the printed matter, and without exposing said walls to the liability of breakage where said articles are made of a brittle material such as glass.

It will be understood that many modifications may be made in the structural details illustrated and described without exceeding the scope of the invention. Thus, instead of or in addition to the yielding backing element or cushion 9, the surface of the printing roll 10 may in some cases be yielding, while the backing element 9 might be in the form of a rigid spring-pressed plate. The drive mechanism for the printing roll 10 and for the inking system may assume any of various forms.

According to a desirable feature of the invention, the printing mechanism described may be followed by a system for receiving and for packing the printed articles, so that the distributor drum 4 serves as a dispensing device to such receiving means. The latter may assume the form of a suitable conveyor belt, racks or boxes with individual compartments for the printed phials, or any other appropriate devices.

In one constructed embodiment of the invention, the distributor drum 4 was formed with a set of thirty peripheral grooves and was rotated at the rate of 20 revolutions per minute, so that the output of printed phials was 36,000 per hour.

What is claimed is:

A printing and dispensing device operative with a source of substantially identical cylindrical articles comprising a hollow drum defining an axis and having peripheral and part cylindrical grooves parallel to said axis, said grooves having a common radius larger than that of said articles, the depth of said grooves being at least equal to the radius of the grooves, a printing roller having an axis parallel to but spaced from the axis of the drum, said roller being rotatably mounted in the drum with the axis of the roller at a distance from the nearest groove which is less than the radius of the roller, and guide means extending from said source adjacent said drum and roller and including a portion concentric with the roller adjacent the same and a portion concentric with said drum to confine said articles in said grooves, the first said portion being of a yieldable material.

References Cited in the file of this patent
UNITED STATES PATENTS

| | | |
|---|---|---|
| 1,208,832 | Putnam | Dec. 19, 1916 |
| 1,223,610 | Pittaluga | Apr. 24, 1917 |
| 1,586,310 | Johnson | May 25, 1926 |
| 2,362,663 | Redin et al. | Nov. 14, 1944 |
| 2,562,168 | Blanchette | July 31, 1951 |
| 2,737,886 | Ruppel | Mar. 13, 1956 |
| 2,866,403 | Zimmermann et al. | Dec. 30, 1958 |